UNITED STATES PATENT OFFICE.

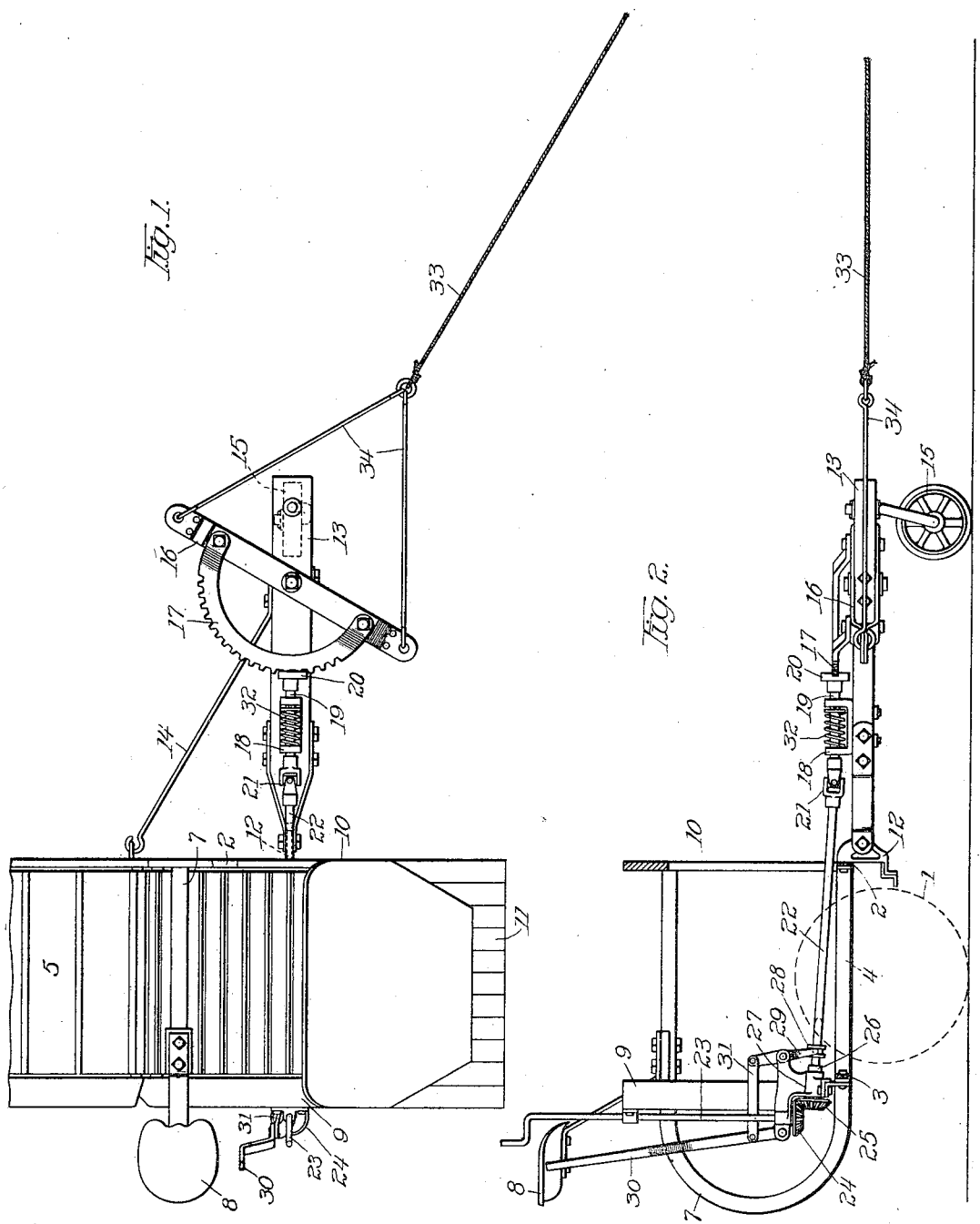

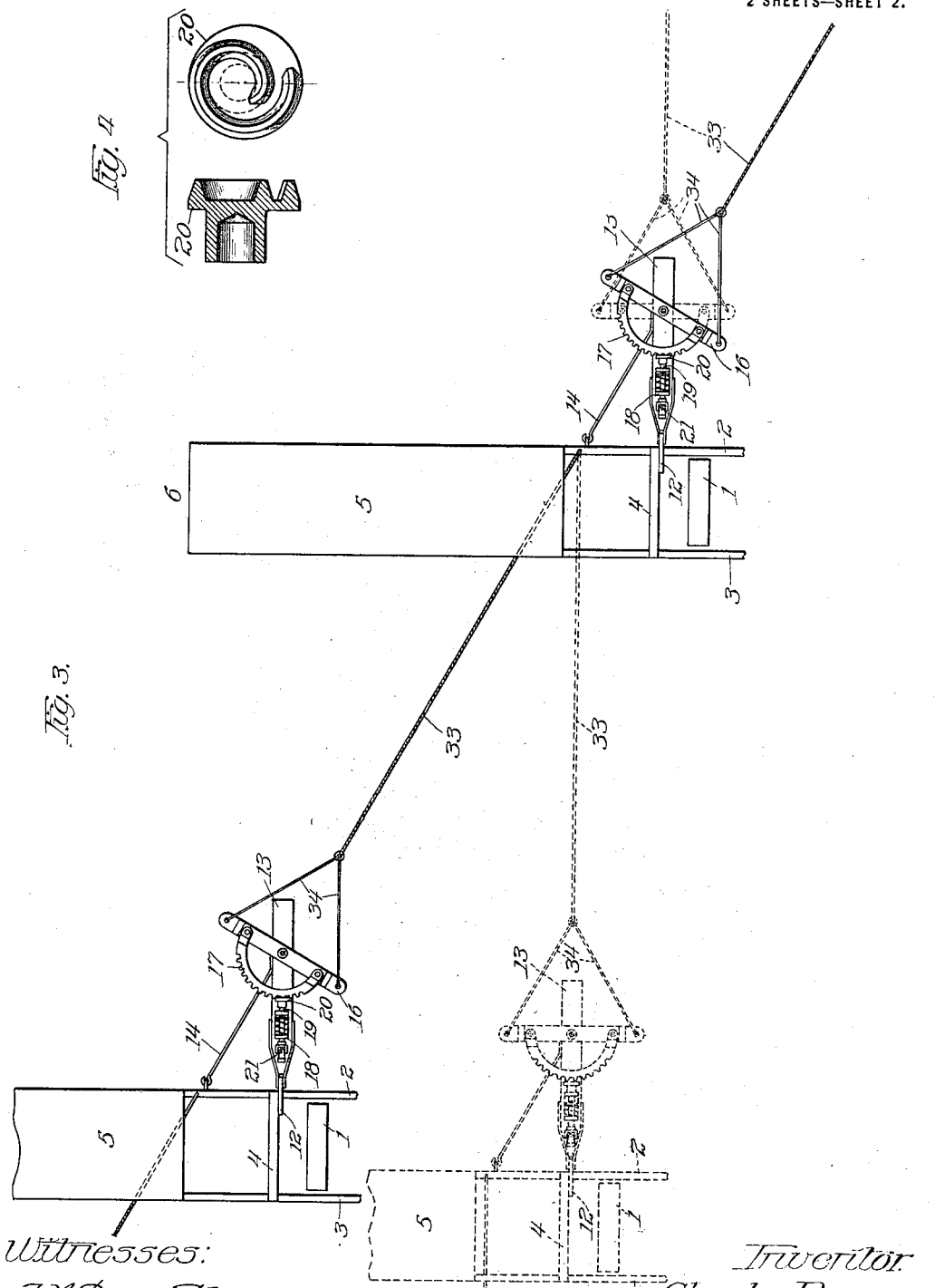

CHARLES PEARSON, OF CHICAGO, ILLINOIS, ASSIGNOR TO INTERNATIONAL HARVESTER COMPANY OF NEW JERSEY, A CORPORATION OF NEW JERSEY.

TANDEM DRAFT CONNECTION FOR HARVESTERS.

1,170,100.  Specification of Letters Patent.  Patented Feb. 1, 1916.

Application filed August 8, 1913. Serial No. 783,807.

*To all whom it may concern:*

Be it known that I, CHARLES PEARSON, a citizen of the United States, residing at Chicago, in the county of Cook and State of Illinois, have invented certain new and useful Improvements in Tandem Draft Connections for Harvesters, of which the following is a full, clear, and exact specification.

My invention relates to an improved draft device whereby a series of grain harvesters or other implements may be connected together in tandem relation and drawn forward by a single source of power, as by means of a traction engine connected with the front machine of the series, and consists in providing draft connections between the different units and between the series and source of power that may be manipulated by the operator on the machine in a manner to control the line of advance of one machine independent of the others, whereby a greater or less width of swath may be cut by any unit of the series; the object of my invention being to provide a draft connection that may be controlled in a simple and positive manner for the purpose described, strong in its construction and efficient in operation. These objects are gained by means of the mechanism comprising my invention, one embodiment of which is illustrated in the accompanying drawing, in which—

Figure 1 is a top plan view of a grain harvester sufficient to illustrate the manner of connecting my improved draft mechanism thereto; Fig. 2 is a side elevation of Fig. 1; Fig. 3 is a plan view of two harvesters connected together in tandem relation; and Fig. 4 is a detail view of the scroll gear.

The same reference characters designate like parts throughout the several views.

1 represents the harvester traction wheel, 2 and 3 the front and rear members, respectively, of the wheeled frame, 4 a cross member of the wheeled frame, 5 a part of the grain platform, 6 the delivery end thereof, 7 the seat supporting pipe, 8 an operator's seat carried by said pipe, 9 a part of the elevator frame at the rear side of the harvester, 10 a part of the front frame of the elevator, 11 the grain binder deck; all of the foregoing parts being common to this class of machines.

12 represents a bracket member secured to the front end of the cross member 4 of the wheeled frame, 13 a short draft tongue having its rear end pivotally connected with the bracket member 12 in a manner permitting the harvester to be tilted about the axis of the traction wheel in the common way.

14 represents a common form of tongue brace having its rear end pivotally connected with the frame of the harvester and coaxially with the draft tongue, and its front end secured to the draft tongue; and 15 represents a caster wheel mechanism pivotally connected with the front end of the draft tongue.

16 represents an evener bar pivotally mounted upon the tongue near its front end in a manner to swing in a horizontal plane at varying angles relative to the line of draft of the machine, 17 a toothed sector rack secured to the evener bar and made concentric with its axis, 18 a bracket member secured to the draft tongue in rear of the sector, 19 a short shaft journaled in the frame parallel with the draft tongue and permitted a longitudinal movement relative thereto, 20 a scroll gear element secured to the front end of the shaft 19 and adapted to engage with the toothed sector, 21 a universal coupling device connecting the front end of the shaft 22 journaled in a fore and aft direction upon the harvester with the rear end of shaft 19; 23 a vertically arranged shaft journaled upon the harvester frame and having an operative crank at its upper end within easy reach of an operator in the seat; 24 a pinion secured to the lower end of shaft 23 and engaging with a pinion 25 integral with a sleeve member 26 journaled in a bracket member 27 secured to the harvester frame. The sleeve 26 receives the shaft 22 in a manner to operate as a driving member and also permits the shaft to move longitudinally thereto.

28 represents a grooved collar secured to the shaft 22; 29 a forked lever pivotally mounted upon the bracket 27, the forked end of the lever being received by the grooved collar 28, and the opposite end of the lever connected with a hand lever 30 by means of a link 31, whereby the operator may manipulate the hand lever in a manner to move the shaft 22 longitudinally and disengage the scroll gear 20 from the toothed sector rack 17; a coiled spring 32 carried by the bracket member 18 being operative to normally retain the scroll gear in engagement with the toothed sector rack.

33 represents a draft member having its front end pivotally connected with the front side of the harvester frame and its rear end with opposite ends of the evener bar 16 by means of supplemental draft members 34.

In operation a harvester, or a series of them, is provided with my improved form of draft connection, and, by means of the shaft 23 and the associated parts of the mechanism, the operator may swing the evener bar 16 about its axis at varying angles relative to the draft tongue, and thereby cause the machine or other implement to advance in either a direct line with the point of connection of the draft members with the propelling power, or at one or the other side of that line, and at any time, by manipulating the hand lever 30, release the sector 17 and evener bar 16 and permit the draft connections of the harvesters to swing laterally as the leading machine makes a turn, the operator thus being able to negotiate a substantially square turn without the great effort heretofore necessary, by simply releasing the sector at the proper times as the draft connections are swung around by the leading machine or tractor. It is, of course, also to be understood that the operator, by disconnecting the sector on a trailing machine, may vary the offset relation of that machine at will without manipulation of the sector operating member 23, the continued forward movement of the machine then operating through its draft connections in a well known manner to throw the machine into the grain.

While I have in this application shown one embodiment which my invention may assume in practice, it is, of course, to be understood that the form shown herein for purposes of illustration may be modified without departing from the spirit of my invention.

What I claim as my invention, and desire to secure by Letters Patent, is:

1. In combination, a trailing unit, a draft connection thereon, means for adjusting said draft connection laterally, and means for disconnecting said adjusting means whereby said draft connection may move freely.

2. In combination, a plurality of operatively connected units normally tending to assume an offset relation, means for adjusting one of the same laterally with respect to the line of draft, and means for disconnecting said means whereby said unit is automatically adjustable laterally as it is moved forward.

3. In a tandem draft connection, a plurality of trailing units, mechanism for adjusting the units laterally relative to the line of draft, and means for rendering said adjusting mechanism inoperative whereby the units are free to move in an opposite direction.

4. In a tandem draft connection, a plurality of trailing units adapted to travel in offset relation relative to each other, mechanism under the control of the operator to varying the line of travel of one unit, and means under the control of the operator for rendering said adjusting mechanism inoperative whereby the unit is free to move in either direction.

5. In a tandem draft connection, a plurality of trailing units, operative draft connections between the same normally tending to swing said units into offset relation, adjusting mechanism for moving a unit in any desired offset relation independent of other units, and means for releasing said adjusting mechanism in any position thereof whereby as the unit moves forward its draft connections may be automatically adjusted.

6. In combination, a frame, a stub tongue thereon, a sector pivotally mounted thereon and movable in a horizontal plane, means on said frame for adjusting said sector about its pivot, and means on said frame for disengaging said adjusting means from said sector whereby the latter may move freely about its pivot.

7. In combination, a frame, a sector pivotally mounted thereon, a draft connection operatively connected to said sector, means for adjusting said sector and draft connection laterally with respect to the line of draft, and means for disconnecting said adjusting mechanism whereby said sector may move freely with respect to the line of draft.

8. In combination, a frame, a stub tongue carried thereon, a sector pivoted on said stub tongue, draft connections operatively connected to said sector, a seat carried on said frame, operative connections operable from said seat for adjusting said sector about its pivot, and supplemental operative connections operable from said seat for disconnecting said adjusting mechanism whereby said sector may move freely about its pivot.

9. In combination, a harvester, a draft tongue carried thereon, a sector pivotally mounted on said tongue, draft connections operatively connected to said sector, a seat on said harvester, connections operable from said seat for adjusting said sector about its pivot, and supplemental connections operable from said seat for disconnecting said adjusting means from said sector whereby the latter may move freely about its pivot.

10. A tandem draft connection for harvesters including, in combination, a relatively short draft tongue, an evener bar pivotally mounted upon said draft tongue in a manner to swing at varying angles relative to said draft tongue, means for controlling its angular position, and a draft member having its front end pivotally connected with a drawing element in a manner permitting it to swing laterally relative to the line of draft and its rear end connected to opposite ends of said evener bar by means of supplemental draft members.

11. A tandem draft connection for harvesters including, in combination, a relatively short draft tongue, an evener bar pivotally mounted upon said draft tongue in a manner to swing at varying angles relative thereto, means for controlling the angular position of said evener bar, means for releasing said controlling means, and draft members having their rear ends connected with opposite ends of said evener bar and their forward ends converging and connected with the rear end of the main draft member.

12. A tandem draft connection for harvesters including, in combination, a relatively short draft tongue, caster wheel mechanism supporting the front end of said draft tongue, an evener bar pivotally mounted upon said draft tongue in a manner to swing in a substantially horizontal plane, means for controlling the angular position of said bar, and draft members having their rear ends connected with opposite ends of said evener bar and their forward ends converging and connected with the rear end of the main draft member.

13. A tandem draft connection for harvesters including, in combination, a relatively short draft tongue, an evener bar pivotally mounted upon said tongue, means for swinging said bar at varying angles relative to the line of draft of the machine, said means including a toothed sector rack connected with said bar, a gear element adapted to engage with said sector, means for operating said gear element, and draft members having their rear ends connected with opposite ends of said evener bar and their front ends converging and connected with the rear end of the main draft member.

14. A tandem draft connection for harvesters including, in combination, a relatively short draft tongue, an evener bar pivotally mounted on said tongue, means for swinging said bar at varying angles relative to the line of draft of the machine, said means including a toothed sector rack connected with said bar, a gear element adapted to engage with said sector, means for operating said gear element, means for disengaging said gear element at the will of the operator, and draft members having their rear ends connected with opposite ends of said evener bar and their front ends converging and connected with the rear end of the main draft member.

In testimony whereof I affix my signature, in the presence of two witnesses.

CHARLES PEARSON.

Witnesses:
  RAY PATTISON,
  R. W. ZARLIN.